United States Patent Office 3,433,704
Patented Mar. 18, 1969

3,433,704
ATTAPULGITE CLAY PAPER FILLER AND METHOD OF FORMING NEWSPRINT THEREWITH
Frederick L. Hecklau, Basking Ridge, and Aldo P. Allegrini, Westfield, N.J., assignors, by mesne assignments, to Engelhard Minerals & Chemicals Corporation, Edison, N.J., a corporation of Delaware
No Drawing. Filed Dec. 16, 1965, Ser. No. 524,987
U.S. Cl. 162—181            7 Claims
Int. Cl. D21h 3/66; D21d 3/00

ABSTRACT OF THE DISCLOSURE

Raw extruded colloidal attapulgite clay is dispersed in water in the presence of sodium silicate and the dispersion is degritted and fractionated. The aqueous clay dispersion is incorporated with an aqueous furnish of newsprint pulp and paper is formed. Newsprint having reduced ink-strike is obtained.

---

This invention relates to the filling of newsprint paper with particulate solid material. The invention is especially directed to a novel clay filler composition and to paper filled therewith.

It is the practice of the industry to fill certain high-grade paper, such as magazine stock, with a mineral matter, such as refined kaolin clay. This is done to increase the opacity and brightness of the paper. Fillers also improve the printability of the sheet by increasing the smoothness, levelness and ink receptivity. The manufacture of newsprint, however, differs substantially from the manufacture of higher grades of paper, such as magazine paper. In manufacturing newsprint, economic considerations rule out the use of materials that are normally employed in making the higher grade paper. Thus, newsprint is made from inexpensive fiber and the large quantities of fillers used with other papers cannot be employed on a practical basis in making newsprint. Also, the paper is printed with low viscosity inks that are substantially different from the inks used in printing more expensive papers.

As a result of these and other factors, the manufacture of newsprint presents unique problems, one of the most significant of which is so-called "show-through." Show-through is a phenomenon whereby the printed matter applied to one face of newsprint is visible on the reverse side. Generally, it results from the fact that the vehicle of low viscosity newsprint inks has a tendency to penetrate or "strike-through" the sheet. This results in the formation of translucent areas in the sheet, reducing opacity, and causing the printing to be visible from the reverse side. The problem is especially serious when sufficient ink is employed to obtain a dark, distinct registration.

To reduce ink strike-through, some newsprint is prepared with a specific type of synthetic amorphous zeolite as the filler. This type of zeolite is obtained by precipitating oxides of sodium and aluminum in the presence of pre-precipitated silica. The zeolite filler material is considerably more expensive than mineral silicate fillers such as clay. However, common filler clays and the calcined kaolins are relatively ineffective in reducing strike-through.

This invention results from the discovery that when a specific type of clay, namely colloidal attapulgite clay, is processed in a manner hereinafter described, the resulting aqueous product is remarkably effective in decreasing strike-through in newsprint.

Stated briefly, in accordance with this invention, an aqueous alkaline slurry adapted for use in the furnish for newsprint stock is obtained by extruding a moist colloidal grade of attapulgite clay under pressure, agitating the extrudate in water with high shear agitation in the presence of alkaline sodium silicate until the clay is dispersed, removing grit from the aqueous dispersion and utilizing the resulting aqueous degritted dispersion as an ingredient of the furnish employed in preparing newsprint paper. Preferably the alkaline, sodium silicate dispersed colloidal clay system is separated into a finer aqueous suspended fraction which is used in making the furnish and a coarser settled fraction which is discarded.

The clay material, described hereinabove, has excellent filler retention properties and brings about a remarkable reduction in ink strike-through. The reduction is comparable to that brought about through the use of the expensive synthetic amorphous precipitated siliceous material that is presently used on a commercial basis to reduce strike-through. The clay material of the present invention is vastly superior to other clay materials, including other processed attapulgite clay products, as will be shown in the illustrative examples which appear hereinafter.

An essential feature of the invention is that the moist colloidal clay is extruded before being dispersed. Thus, clay which has been dispersed with alkaline sodium silicate, but which has not been extruded, is less ineffective in reducing strike-through. Another feature is that sodium silicate is used as the dispersant. Condensed phosphates are widely employed to disperse attapugite clays for various uses. The use of condensed phosphates is, however, outside the scope of the invention since condensed phosphates impair filler retention and the desired results are not realized.

Another feature of the invention is that the extruded, dispersed clay is employed in an aqueous condition or state. In other words, the processed clay slip is not dried to pulverulent state or condition before it is mixed with wood pulp in preparing paper furnish. The accompanying examples show that the effectiveness of the dispersed clay slurry is substantially impaired when it is dried and then milled to a fine particle size suitable for paper filler use.

To produce the clay filler material of this invention, the starting material must be a colloidal grade of attapulgite clay, i.e., attapulgite clay which has never been dried to a volatile matter below about 18 percent. For economic reasons, it is preferably to employ crushed raw clay as mined. The moisture content of the raw clay will vary with the humidity since colloidal attapulgite clay is very hydroscopic. Typically, the raw clay has a free moisture (F.M.) of 45 percent and a volatile matter (V.M.) of 55 percent. To extrude the clay, as required in the practice of this invention, the clay should have a volatile matter within the range of about 50 percent to 60 percent. The term "free moisture" as used herein refers to the weight percentage of clay eliminated by heating the clay essentially to constant weight at 220° F. The term "volatile matter" refers to the weight percentage of clay eliminated by heating the clay essentially to constant weight at 1800° F. When the clay contains insufficient water for extrusion, water may be mixed with clay that has been crushed to a size not greater than about one-quarter inch, using sufficient water to bring the volatile matter to an amount suitable for extrusion. A pug mill can be used to mix the clay with the water. The pugged clay is extruded under pressure, typically within the range of about 20 to 500 p.s.i. An auger extruder should be used. It is convenient to use a die-plate, preferably a multiorificed die-plate, to control the retention time of the clay in the extruder and the energy input and pressure. The use of a die-plate also results in the formation of a rod-like product which can be readily handled in the subsequent processing steps.

The sodium silicate can be added to an undispersed slip of the extruded colloidal clay or, more preferably, the green extruded colloidal clay is added to an aqueous solution of the sodium silicate. It is essential to agitate the clay in the water to disperse the clay. Any high speed agitator will suffice. The dispersion can be carried out at ambient temperature up to temperatures below which the dispersion has too high a vapor pressure. A temperature of about 200° F. is suitable. In making up the dispersion, an alkaline soluble sodium silicate is used, i.e., a sodium silicate having a $Na_2O$ to $SiO_2$ mol ratio within the range of 1:1.60 to 1:3.75. Excellent results have been obtained with a sodium silicate having a percent $Na_2O$: percent $SiO_2$ of 1:3.22. Preferably some sodium hydroxide is incorporated with the sodium silicate since the dispersibility of the clay with the sodium silicate is optimum at a pH within the range of 10 to 12.

The clay solids in the dispersion fall within the range of about 10 percent to about 30 percent (i.e., 10 to 30 parts by weight volatile-free clay to 70 to 90 parts by weight total water). At clay solids within the preferred range, excellent dispersion of the clay can be realized while producing high solids fluid dispersions. Obviously, high solids dispersions are more economical to transport and use. Thus, the dispersion of processed clay is preferably formulated at the highest solids possible, e.g., with clay solids within the range of about 22 percent to 28 percent.

The sodium silicate is employed in amount sufficient to disperse the clay. This quantity will vary with the specific clay crude that is employed, with the $Na_2O:SiO_2$ ratio of the sodium silicate and with the clay solids of the dispersion. Generally speaking, the amount of sodium silicate is within the range of about 2 percent to 5 percent anhydrous sodium silicate, based on the volatile free clay weight. Commercial soluble sodium silicates are frequently supplied as aqueous solutions. Good results have been realized with "O"® sodium silicate, which is a commercial solution containing 62 percent water. The commercial solution was employed in amount of 8 percent of the volatile-free clay weight, corresponding to about 3 percent sodium silicate, anhydrous sodium silicate basis. The quantity of sodium hydroxide employed with the clay is typically within the range of about ½ percent to 1 percent, based on the volatile-free clay weight. The dispersed slip is a thin fluid system and has substantially the viscosity of water. In the absence of the dispersant, the clay-water system could be a viscous mass.

The dispersed fluid slip can be degritted by wet screening. This can be done by pumping the slip through a 325 mesh (44 microns) screen to eliminate plus 325 mesh oversize (i.e., "grit"). Preferably, the slip is then centrifuged at a speed and for a time calculated to cause all particles larger than about 2.5 microns to settle. Equally good results can be expected when the screening is omitted and all particle removal, including removal of plus 44 micron grit, is effected in the centrifuge. Batch centrifuges can be used for laboratory evaluation or the centrifuging can be effected on a continuous basis. With a typical raw attapulgite clay, hydroclassification and separation of all plus 2.5 micron material removes a total of about 10 percent to 20 percent by weight of the starting clay. (Particle dimensions mentioned herein refer to values calculated by applying Stokes' law to specimens subjected to centrifugal sedimentation and assuming a viscosity of 25 centipoises.)

If desired, the slurry can be dried to eliminate some water. However, the aqueous alkaline slurry cannot be dried to a free moisture content less than about 10 percent.

In the practice of this invention, the processed clay slurry is added to a slurry of wood pulp and the resulting furnish is fed to the wire of a paper-making machine on which the paper is formed. Wood pulp of the type conventionally used in making newsprint is employed. An acid substance, preferably alum, is added to the pulp after beating in the usual manner. Auxiliary filler retention material can be used.

In practice, the slurry of sodium silicate dispersed extruded clay is employed in such quantity that the clay content in the sheet will be within the range of about 2 percent to 14 percent by weight (preferably about 4 percent to 8 percent), calculated on moisture-free clay weight basis. When too little slurry is used and the quantity of clay in the filled sheet is too low, the reduction in strike-through may be inadequate to compensate for the additional expense incurred by using a filler.

The present invention and some of its advantages are demonstrated by the following examples in which various clay minerals were processed and used to fill newsprint sheets. The filled sheets were printed with black newsprint ink and compared for strike-through of the ink. The printed filled sheets were also compared with printed sheets filled with a commercial amorphous zeolite filler. The minerals in the investigation included a variety of processed attapulgite clay products, including a clay slurry of the present invention. It was found that, of a wide variety of clay materials studied, the extruded sodium silicate dispersed slurry of the present invention gave the best results and differed substantially from other clay products, including other attapulgite clay products, in its effectiveness in reducing strike-through. Further, only the product of this invention was comparable in effectiveness to the commercial zeolite. The details are as follows:

ATTAPULGITE PRODUCTS

Preparation of colloidal attapulgite clay filler product of this invention

Sample No. 1: Extruded, sodium silicate dispersed, degritted slurry of colloidal attapulgite clay.—Raw attapulgite clay from a mine near Attapulgus, Ga., was crushed to chunks smaller than ¼". The raw clay was pugged with added water to a volatile matter content of about 58 percent and extruded through a die having holes about ⅛". The extrudate was cut into pellets about ⅛" long as it issued through the die.

The green extrudate was mixed with distilled water, using 39.0 pounds of extrudate and 29.0 pounds water. These quantities produced a 25 percent solids system. "O"® brand sodium silicate solution was added in amount of 617.4 grams. ("O"® brand has a $Na_2O:SiO_2$ mol ratio of 1:3.22 and contains 38 percent solids, the balancing being water.) 38.6 grams of 97 percent sodium hydroxide was then added. The mixture, which contained 23.6 percent solids, was charged to a Denver mixer (an impellor agitated mixer widely used in the ore flotation field to "condition" ore pulp for flotation). The charge was agitated for two hours and then screened through a 100 mesh Tyler screen. The minus 100 mesh slip was centrifuged and the supernatant slip of fine size fraction of collodial attapulgite was recovered. One portion of the supernatant slip was used in filling newsprint, as described hereinafter.

Preparation of other attapulgite clay filler products

Sample No. 2: Product obtained by drying Sample No. 1.—A portion of the supernatant slip of colloidal clay (Sample No. 1) was dried on a drum dryer to a V.M. of about 20 percent.

The dried material was then fluid energy ground to a particle size suitable for paper filling purposes.

Sample No. 3: Unextruded, sodium silicate dispersed, degritted slurry of colloidal attapulgite clay.—The processing of Sample No. 1 was repeated with a sample of the crude that had not been extruded before being dispersed with the sodium silicate and centrifuged.

Sample No. 4: Unextruded, tetrasodium pyrophosphate dispersed degritted slurry of colloidal attapulgite clay.—The procedure followed in making Sample No. 3 was carried out with tetrasodium pyrophosphate (TSPP) as the dispersant.

Sample No. 5: "Attasorb® RVM"—a commercial absorbent grade of activated attapulgite clay.—This clay was prepared by drying screened crude clay and fluid energy grinding the dried clay. Typical samples of "Attasorb® RVM" have a V.M. of 12 percent and an F.M. of 2 percent (as produced).

Sample No. 6: "Attagel® 40"—a commercial colloidal grade of attapulgite clay.—This clay product was produced by extruding raw attapulgite clay, mildly drying and fluid energy grinding. The material had a V.M. of 24.5 percent and an F.M. of 15 percent (as produced).

KAOLIN CLAY PRODUCTS

Sample No. 7: "Stellar"—a commercial paper coating grade of kaolin clay.—This clay was produced by blunging crude Georgia kaolin clay, degritting, fractionating, recovering a fine size fraction at least 90 percent minus 2 microns (equivalent spherical diameter), bleaching, filtering, washing, drying and pulverizing.

Sample No. 8: Calcined kaolin clay.—The clay was a high purity Georgia kaolin clay that had been calcined at about 1900° F. to a V.M. below 1 percent and pulverized.

The pulp that was used to make new handsheets consisted of ⅔ ground wood fibers and ⅓ semibleached kraft fibers. The handsheets were made up with 2.50±0.10 gram air dried pulp per sheet (37 lb./3000 sq. ft. ream). All the sheets were made from a master batch of fiber which was refined to a Schopper-Riegler freeness of about 35. All handsheets were made using a Noble & Wood laboratory handsheet machine and equipment. Minerals were added in the form of aqueous dispersions of 12.5 percent weight concentration in amounts of 6.8 percent, 14 percent and 28 percent basis per sheet. Following the addition of a mineral slurry, 20 percent alum solution was added in amount of 15 cc. per sheet. The alum solution contained sulfuric acid in amount to provide a pH of 4.6±0.1 per 10 liters of tap water in the headbox. Sets of fifteen sheets each were prepared at each level of each mineral addition at the 37 pounds basis weight level.

Ash determinations were performed in accordance with TAPPI Standard Method T-413, M-58.

The handsheets were calendered on a supercalender with one pass at 500 lb. per linear inch, followed by a second pass at 1000 lb. per linear inch to simulate the action of paper machine calenders.

Sheet brightness was measured on the G.E. Brightness meter and sheet opacity (contrast ratio) measurements were made on a Bausch and Lomb Opacimeter following standard TAPPI procedures.

Printing was done on a Vandercook No. 4 Proof Press with IPI newsprint ink number NX-2595 at eight different levels of printing blackness ranging between 79 and 94 and at 10 mils impression. Blackness is defined as 100 minus the ratio (expressed as a percent) of the reflectance of the surface of a solid print to the reflectance of the unprinted paper while both are backed with a pile of similar unprinted sheets. The blackness was maintained at any one level to within ±1.0 unit of the desired value throughout a series of 96 sheets (one from each set). This was accomplished by small additions of ink between each four to six sheets printed. Blackness was calculated from reflectance readings taken on the Bausch and Lomb Opacimeter immediately after each impression.

The printed sheets were conditioned in a constant temperature and humidity room (temperature 72° F. and humidity 50 percent) for a period of 24±3 hours before determining ink strike-through. Strike-through is defined as 100 minus the ratio (expressed as a percent) of reflectance of the back of the printed area to the reflectance of the unprinted sheet while both are backed by a black body. This was calculated from reflectance readings taken on the Bausch and Lomb Opacimeter.

From the data obtained with the printed sheets, graphs were made plotting strike-through versus print blackness. This was done for each filler at each level of filler content. From the graphs, the values of strike-through at a blackness level of 90.0 percent were obtained. A second series of graphs was made plotting the values of strike-through at the 90.0 percent blackness level versus percentage mineral content. For these graphs, the strike-through values at 4 percent filler content level were obtained. These values formed the basis for comparing the performance of the various fillers. With the best filler being rated "1," the fillers were rated in order of decreasing effectiveness in reducing strike-through at 90.0 percent blackness at the 4 percent filler level. The results, summarized in table form, show that the clay product of this invention was markedly superior to other clays, including other attapulgite clay products, in reducing ink strike-through.

EFFECTIVENESS OF FILLERS IN REDUCING INK STRIKE-THROUGH IN NEWSPRINT SHEETS

| Filler | Method of preparing filler | Strike-through at 90 blackness at 4% filler content | Rating |
| --- | --- | --- | --- |
| Commercial zeolite | Oxides of silicon and aluminum precipitated in presence of pre precipitated silica. | 6.7 | 1 |
| Attapulgite products: | | | |
| Sample No. 1 (product of invention) | Extruded, sodium silicate-dispersed slurry of colloidal clay. | 7.0 | 2 |
| Sample No. 2 | Same as No. 1 but dried | 8.8 | 4 |
| Sample No. 3 | Same as No. 1 but not extruded. | 9.0 | 5 |
| Sample No. 4 | Unextruded, TSPP dispersed slurry of colloidal clay. | 7.8 | 3 |
| Sample No. 5 | Dried, heat activated clay | 8.8 | 4 |
| Sample No. 6 | Extruded colloidal clay (nondispersed). | 9.8 | 6 |
| Kaolin product: | | | |
| Sample No. 7 | Paper coating grade (uncalcined). | 12.8 | 8 |
| Sample No. 8 | Paper filling grade (calcined). | 10.4 | 7 |

We claim:

1. An aqueous alkaline slurry of a fine size fraction of extruded degritted colloidal attapulgite clay containing sodium silicate as a dispersant, said slurry having a clay solids content within the range of 10 to 30 percent by weight and being characterized by the fact that said slurry has never been dried to a free moisture content below 10 percent by weight, said slurry containing particle sizes of less than 44 micron and said slurry being adapted for use in the preparation of clay-filled newsprint sheet material having reduced ink strike-through.

2. A process for reducing the ink strike-through of newsprint which comprises adding an aqueous slurry of dispersed extruded degritted colloidal attapulgite clay to an aqueous furnish of newsprint pulp, using sufficient clay slurry to provide clay-filled paper, and forming clay-filled sheet material therefrom, said slurry being formed by extruding moist colloidal attapulgite clay, dispering said clay in water containing alkaline sodium silicate as a dispersant, and removing grit from the dispersion to form a degritted aqueous dispersion of colloidal attapulgite clay having a free moisture content of more than 10% by weight.

3. The process of claim 2 wherein the degritted dispersion separated into a finer suspended fraction and a coarser fraction, said finer suspended fraction being the aqueous slurry of dispersed colloidal attapulgite clay which is added to said aqueous furnish of newsprint pulp.

4. The process of claim 2 wherein said aqueous slurry of colloidal attapulgite clay is employed in quantity such that the attapulgite clay content of said clay filled sheet material is within the range of about 2 percent to 14 percent by weight, calculated on a moisture-free clay weight basis.

5. The process of claim 4 wherein the clay content of said clay-filled sheet material is within the range of about 4 percent to 8 percent by weight, calculated on a moisture-free clay weight basis.

6. The process of claim 3 wherein said slurry of colloidal clay has a clay solids content within the range of 10 percent to 30 percent by weight and is added to said aqueous furnish in amount to provide clay-filled paper containing clay in amount within the range of 2 percent to 14 percent by weight, calculated on a moisture-free clay weight basis.

7. Newsprint prepared by the process of claim 2.

References Cited

UNITED STATES PATENTS

| | | |
|---|---|---|
| 2,205,609 | 6/1940 | Vail _____ 252—313 X |
| 2,641,557 | 6/1953 | Green. |
| 2,905,643 | 9/1959 | Billue et al. _____ 252—313 |
| 3,343,973 | 9/1967 | Billue. |

S. LEON BASHORE, *Primary Examiner.*

U.S. Cl. X.R.

106—72, 73, 288, 308; 252—313